United States Patent
Norman et al.

(10) Patent No.: US 9,671,779 B2
(45) Date of Patent: Jun. 6, 2017

(54) METHOD AND SYSTEM FOR FILTERING LOT SCHEDULES USING A PREVIOUS SCHEDULE

(71) Applicant: Applied Materials, Inc., Santa Clara, CA (US)

(72) Inventors: David Everton Norman, Bountiful, UT (US); Keith Pare, Austin, TX (US); Steve Marteney, Park City, UT (US); Madhav R. Kidambi, Glen Allen, VA (US); Fumio Kawada, Gifu (JP)

(73) Assignee: APPLIED MATERIALS, INC., Santa Clara, CA (US)

( * ) Notice: Subject to any disclaimer, the term of this patent is extended or adjusted under 35 U.S.C. 154(b) by 483 days.

(21) Appl. No.: 14/215,990

(22) Filed: Mar. 17, 2014

(65) Prior Publication Data

US 2014/0277667 A1    Sep. 18, 2014

Related U.S. Application Data

(60) Provisional application No. 61/792,441, filed on Mar. 15, 2013.

(51) Int. Cl.
*G06F 19/00* (2011.01)
*G05B 19/418* (2006.01)

(52) U.S. Cl.
CPC ........ *G05B 19/41865* (2013.01); *G05B 2219/32258* (2013.01); *G05B 2219/32263* (2013.01); *Y02P 90/20* (2015.11)

(58) Field of Classification Search
CPC .... G05B 19/41865; G05B 2219/32128; G05B 2219/45031; Y02P 90/20; G06Q 10/06
See application file for complete search history.

(56) References Cited

U.S. PATENT DOCUMENTS

| | | | | |
|---|---|---|---|---|
| 5,925,212 A * | 7/1999 | Rice | ........ | H01J 37/32871 156/345.27 |
| 6,216,109 B1 * | 4/2001 | Zweben | ........ | G06Q 10/04 705/7.12 |
| 7,120,511 B1 * | 10/2006 | Tanzer | ........ | G06Q 10/06 700/100 |
| 7,702,411 B2 * | 4/2010 | Bagchi | ........ | G05B 19/41865 700/100 |
| 7,801,633 B2 * | 9/2010 | Yamamoto | ........ | G05B 19/41865 700/100 |
| 7,974,723 B2 * | 7/2011 | Moyne | ........ | G05B 19/41865 700/101 |

(Continued)

OTHER PUBLICATIONS

Yugma et al., A smart sampling scheduling and skipping simulator and its evaluation on real data sets, Dec. 2007, 10 pages.*

(Continued)

*Primary Examiner* — Thuy Dao
(74) *Attorney, Agent, or Firm* — Lowenstein Sandler LLP (57) ABSTRACT

Methods and systems are provided for filtering lot schedules of a manufacturing facility. A first schedule is identified, in which the first schedule is a previously executed schedule. A processing device generates a pool of lots to be scheduled using information from the first schedule, in which the pool of lots is a subset of a plurality of lots associated with the first schedule. The processing device generates a second schedule using the pool of lots.

11 Claims, 4 Drawing Sheets

(56) References Cited

U.S. PATENT DOCUMENTS

| | | | | |
|---|---|---|---|---|
| 8,165,704 | B2* | 4/2012 | Burda | G05B 19/41865 438/14 |
| 8,180,615 | B2* | 5/2012 | Brown | B01J 19/0006 703/11 |
| 8,965,549 | B2* | 2/2015 | Slocum | G06Q 10/06 700/100 |
| 2007/0117230 | A1* | 5/2007 | Huang | G05B 19/41865 438/14 |
| 2008/0216077 | A1* | 9/2008 | Emani | G05B 19/41865 718/102 |
| 2009/0119669 | A1* | 5/2009 | Norman | G06Q 10/06 718/102 |

OTHER PUBLICATIONS

Obeid et al., Scheduling job families on non-identical parallel machines with time constraints, Dec. 2011, 12 pages.*

Chen et al., Learning-based adaptive dispatching method for batch processing machines, Dec. 2013, 10 pages.*

* cited by examiner

METHOD AND SYSTEM FOR FILTERING LOT SCHEDULES USING A PREVIOUS SCHEDULE

CROSS REFERENCE TO RELATED APPLICATIONS

This application claims the benefit of priority of U.S. Provisional Patent Application No. 61/792,441, filed Mar. 15, 2013, which is hereby incorporated by reference herein in its entirety.

TECHNICAL FIELD

Implementations of the present disclosure relate to scheduling generally, and more particularly, to filtering lot schedules using a previous schedule.

BACKGROUND

A difficulty in addressing a manufacturing scheduling problem can be related to the problem size. Typical manufacturing scheduling problems involve stations, tasks to be performed on the stations, and a significantly large number of lots to be processed by the stations. For example, scheduling can depend on a number of tools, a number of lots, a sequential order of operations, constraints, etc. With large scheduling problems, it is generally not possible, nor desirable, to schedule all of the large number of lots. Traditional scheduling systems spend a great amount of time and computing resources in solving a scheduling problem that involves many variables and factors. The difficulty grows very fast as the size of the scheduling problem grows. For this reason, large scheduling problems can be impossible to solve directly.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" implementation in this disclosure are not necessarily to the same implementation, and such references mean at least one.

DETAILED DESCRIPTION

Implementations of the disclosure are directed to a method and system for filtering lots using a previous schedule to generate a new schedule. A schedule can be a list of tasks that each station (tool) processes. The schedule can include the task start times. Stations, hereinafter also referred to as "tools", can be certified to run certain tasks. A task can be a task used in the manufacturing of semiconductors and there can be different types of tasks. Examples of tasks can include, and are not limited to, a task to manufacture a product, a task to use a reticle manufacturing tool, a task to inspect a reticle manufacturing tool, a task to process a lot of wafers, etc. A manufacturing facility (e.g., factory) may have a large number of lots to be scheduled and may generate schedules at regular intervals (e.g., every ten minutes, every hour, etc.). A lot can be a group of wafers. Implementations use a previous schedule to identify a portion of the large number of lots to create a smaller, more manageable pool (e.g., list) of lots that can be used to create a new schedule. Implementations greatly reduce the amount of time and resources used to create schedules by using information from a previous schedule.

Figure 1:
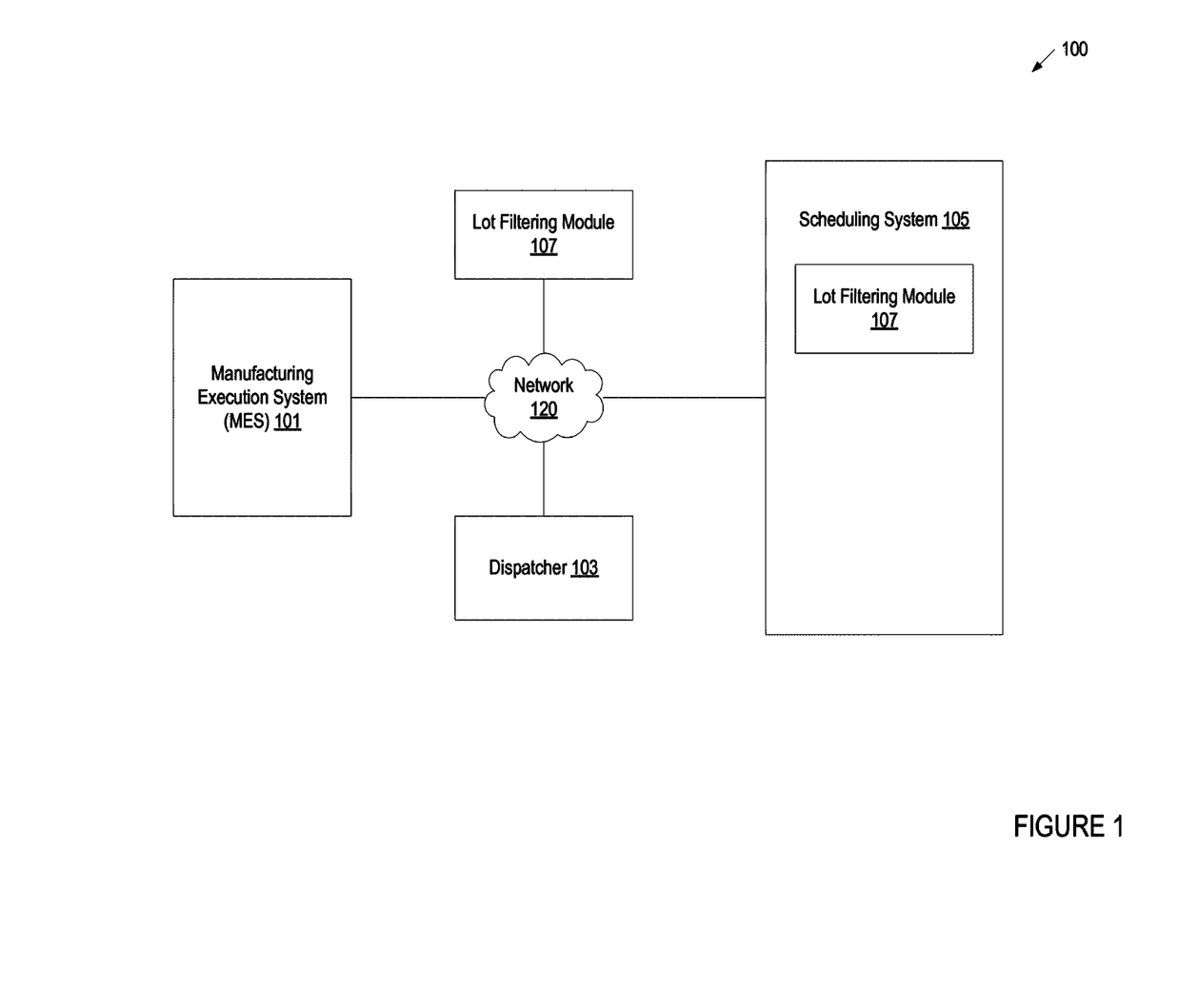
FIG. 1 is a block diagram illustrating a scheduling system utilizing a lot filtering module.

FIG. 1 is a block diagram illustrating a manufacturing system 100 including a fabrication system data source (e.g., manufacturing execution system (MES) 101), a dispatcher 103, and a scheduling system 105 communicating, for example, via a network 120. The network 120 can be a local area network (LAN), a wireless network, a mobile communications network, a wide area network (WAN), such as the Internet, or similar communication system.

In one implementation, the scheduling system 105 includes a lot filtering module 107. In another implementation, the scheduling system 105 communicates with an external lot filtering module 107, for example, via the network 120. The MES 101, dispatcher 103, scheduling system 105, and lot filtering module 107 can be individually hosted by any type of computing device including server computers, gateway computers, desktop computers, laptop computers, tablet computer, notebook computer, PDA (personal digital assistant), mobile communications devices, cell phones, smart phones, hand-held computers, or similar computing device. Alternatively, any combination of MES 101, dispatcher 103, scheduling system 105, and lot filtering module 107 can be hosted on a single computing device including server computers, gateway computers, desktop computers, laptop computers, mobile communications devices, cell phones, smart phones, hand-held computers, or similar computing device.

The scheduling system 105 may have a large number of lots to schedule and can generate schedules for processing lots at regular intervals. For example, the scheduling system 105 may generate a schedule every ten minutes, every hour, etc. The lot filtering module 107 can use a previous schedule to create a new schedule (e.g. the new schedule may be generated using a processing device of the scheduling system 105). A schedule can include one or more sets of tasks T and a set (e.g., set S) of stations, also known as tools. For example, a schedule may involve forty to fifty stations and more than two thousand tasks. Each task can be processed on one or more stations. The schedule can include a list of what task should be processed on which tool at what time. The lot filtering module 107 can use information in a previous schedule to determine which of the lots to process for a new schedule and can create the new schedule using the selected lots. The new schedule can include the lots to be used for the tasks for the tools.

In one implementation, the scheduling system 105 is coupled to a factory system data source (e.g., MES 101, ERP) to receive lot data and equipment status data. In one implementation, the scheduling system 105 provides the entire schedule (e.g., new schedule) to a dispatcher 103. The dispatcher 103 can be integrated through the MES 101 to dispatch, for example, wafer lots accordingly.

Figure 2:
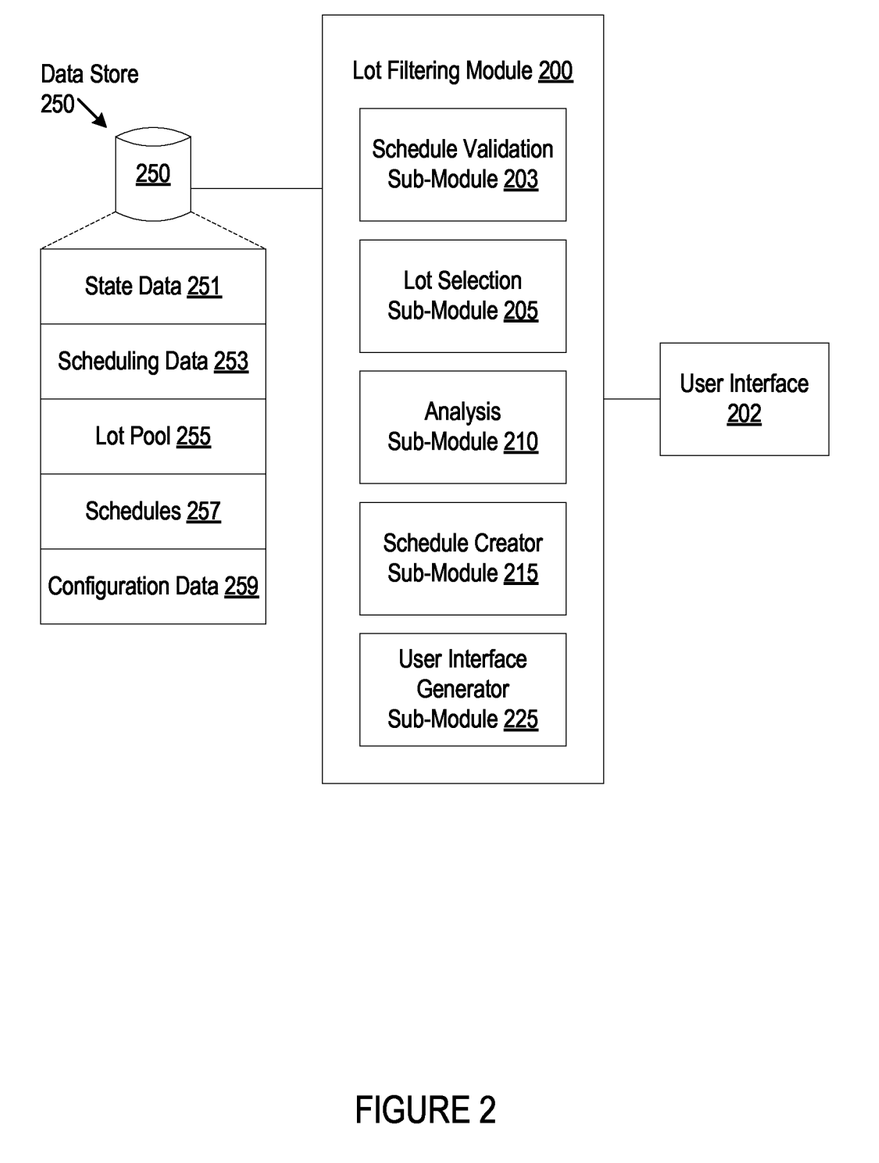
FIG. 2 a block diagram of one implementation of a lot filtering module.

FIG. 2 is a block diagram of one implementation of a lot filtering module 200. In one implementation, the lot filtering module 200 can be the same as the lot filtering module 107 of FIG. 1. The lot filtering module 200 can include a schedule validation sub-module 203, a lot selection sub-module 205, an analysis sub-module 210, a schedule creator sub-module 215, and a user interface (UI) generator sub-module 225.

The lot filtering module 200 can be coupled to one or more data stores 250. The data store 250 can be a persistent storage unit. A persistent storage unit can be a local storage unit or a remote storage unit. Persistent storage units can be a magnetic storage unit, optical storage unit, solid state storage unit, electronic storage unit (main memory) or similar storage unit. Persistent storage units can be a monolithic device or a distributed set of devices. A "set", as used herein, refers to any positive whole number of items.

The data store 250 can store state data 251 and scheduling data 253. The state data 251 can describe the current state of the manufacturing facility. Examples of state data 251 can include, and are not limited to, the lots that are available as WIP (work in progress), available tools (e.g., tools not under maintenance), tool identifiers, tool status (e.g., idle, active, etc.), start and end times for tools that are processing, previous tool setups, next tool setups, secondary resource (e.g., reticle) availability, lots that are on hold, lots that are available, lots that are active, lots that are reserved, the priority level for the lots, due dates related to the lots, the lots that have run with a previous schedule, current tool setups, object functions for the lots, objective function weights for lots, reticle transport costs, lower objective function station costs, reticles that do not need inspection, etc.

The scheduling data 253 can include previous schedules and information relating to the lots and tools used for the previous schedules. The scheduling data 253 can define tasks to be performed and a set of stations (tools) for performing the tasks. The scheduling data 253 can also describe whether a task can be processed on one or more stations (tools) and can identify one or more stations for performing the task. The scheduling data 253 can include the number stations, station data (e.g., status) describing specific stations, weight type, weight values, etc. The weight types and weight values can be for stations and/or tasks.

The schedule validation sub-module 203 can select a previous schedule from the scheduling data 251 and can remove any invalidity in the previous schedule. An invalidity is an element of the previous schedule that would not be valid based on the current state of the manufacturing facility. For example, the state data 251 may indicate that Lot-384782 is on hold and the schedule validation sub-module 203 can remove Lot-384782 from the previous schedule if Lot-384782 is in the previous schedule. One implementation of removing invalidities is described in greater detail below in conjunction with FIG. 3.

The lot selection sub-module 205 can selects lots to be scheduled for a new schedule and can create a lot pool 255 (e.g., list) of lots that are to be used in the new schedule. The lot pool 255 (hereinafter also referred to as a "pool") can be stored in the data store 250. The lot selection sub-module 205 use configuration data 259 that is stored in the data store 250 to determine which lots to add to the pool 255. The configuration data 259 can include selection criteria that may specify that the lot selection sub-module 205 should select high priority lots, lots that can be assigned to any tool idle times in the previous schedule, lots that can satisfy performance indicator criteria (e.g., move targets), and lots to ensure that there is a sufficient number of lots to satisfy the work capacity of each tool. The configuration data 259 can be pre-defined and/or user (e.g., system engineer, industrial engineer, process engineer, system administrator, etc.) defined.

The user interface generator sub-module 225 can generate a user interface 202 that can receive user input for configuration data 259, state data 251, scheduling data 253. In on implementation, the configuration data 259, state data 251, scheduling data 253 or a portion of the configuration data 259, state data 251, and scheduling data 253 is provided by a system in the manufacturing facility.

The lot selection sub-module 205 can use the state data 251 to determine which lots to add to the pool 255. For example, the lot selection sub-module 205 can determine which lots are the high-priority lots and can add the high-priority lots to the pool 255. One implementation for selecting lots to add to the pool is described in greater detail below in conjunction with FIG. 3. The lot selection sub-module 205 can select lots that satisfy selection criteria, such as, lots that can be assigned to tool idle time periods, lots that satisfy performance indicators (e.g., move targets), lots that satisfy tool work capacity, etc.

The analysis sub-module 210 can perform analyses that can be used to determine whether the current lots in the pool 255 satisfy selection criteria in the configuration data 259. For example, the analysis sub-module 210 can identify tool idle time periods in the previous schedule and determine which of the tool idle time periods to ignore. In another example, the analysis sub-module 210 can determine which lots satisfy performance indicators (e.g., move targets) and which lots that satisfy tool work capacity, etc. The analysis sub-module 210 can determine whether the lots in the current pool 255 satisfy the selection criteria or whether lots that are not in the current pool 255 satisfy the selection criteria. The analysis sub-module 210 can use the stat data 251 and scheduling data 253 to perform the analyses.

The schedule creator sub-module 215 can create a new schedule 257 using the lots in the lot pool 255. The new schedule 215 can include the lots from the pool 255 to be used for the tasks for the tools. The schedule creator sub-module 215 can create a new schedule for each tool, a new schedule for more than one tool, etc. The new schedule 257 can include a list of what task should be processed on which tool at what time, and can assign a lot from the pool 255 to a corresponding task/tool. The schedules 257 can be stored in the data store. The lot filtering module 200 can send a schedule 257 to a dispatcher system, a corresponding tool, etc.

Figure 3:
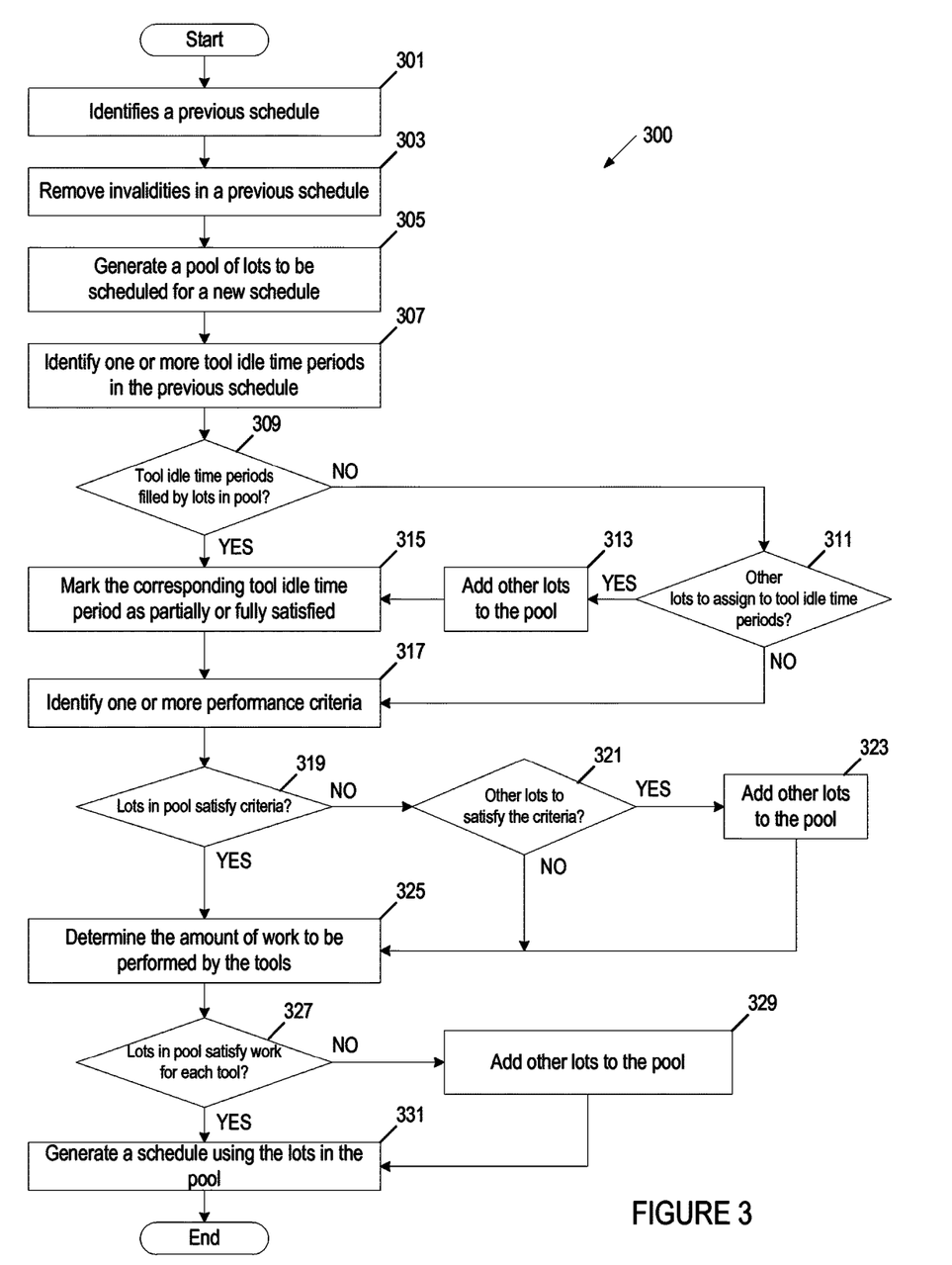
FIG. 3 illustrates one implementation of a method for filtering lots using a previous schedule to generate a new schedule.

FIG. 3 is a flow diagram of an implementation of a method 300 for creating a new schedule using a previous schedule. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by the lot filtering module 107 hosted by a computing device of FIG. 1. The manufacturing facility may have a large number of lots to be scheduled. The lot filtering module can use information in a previous schedule to identify a subset of the lots to use in a new schedule.

At block 301, the server identifies a previous schedule. In another implementation, the previous schedule is a schedule that was executed. In one implementation, the previous schedule is an immediately preceding schedule that was executed. At block 303, the server removes invalidities in the previous schedule. An invalidity is an element of the previous schedule that would not be valid based on the current state of the manufacturing facility. The server can remove the lots from the previous schedule that are not valid based on the current state of the manufacturing facility. The server can use state data that is stored in a data store that is coupled to the lot filtering module. For example, some lots that were used to run the previous schedule may no longer be WIP (work in progress), and the server can remove the lots from the previous schedule. Other examples can include, and are not limited to, the server removing lots that no longer have a valid tool that can process the lots, removing lots that require a secondary resource (e.g., reticle) that is no longer available, removing any other lots that can no longer be scheduled (e.g., lots that are on hold), etc.

At block 305, the server generates a pool (e.g., list) of lots to be scheduled for a new schedule. The pool is a subset of the large number of lots at the manufacturing facility. For example, there may be one thousand lots and the server can generate a pool of lots, which is a subset of larger set of lots. The server can evaluate lots in the larger set of lots and add the high-priority lots to the pool. In one implementation, a scheduling system can determine the high-priority lots. In one implementation, the server can access lot data that is stored in a data store that is coupled to the server that describes the priority for the lots. The lot data can be pre-defined and/or user (e.g., system engineer, process engineer, industrial engineer, system administrator, etc.) defined. The lot data may be generated by another system, such as another scheduling sub-system.

A schedule (e.g., previous schedule, new schedule) can have a scheduling interval. The scheduling interval can define work capacity for each tool by time. For example, a schedule may have a scheduling interval of six hours' capacity of work for each tool. The server can evaluate lots in the larger set of lots and add the lots with due dates within scheduling interval of the new schedule to the pool. The server can add the lots that ran in the previous schedule's scheduling interval to the pool. In another example, the server can add the lots that are active and the lots that are on reserve to the pool.

At block 307, the server identifies one or more tool idle time period in the previous schedule and determines whether any of the lots in the pool can be assigned to the tool idle time intervals. A schedule can include periods of time. The periods may or may not be assigned to a lot. For example, there may be a period where the tool is idle (e.g., the tool is not performing any work on a lot). For example, a tool may not be assigned any work at 10:00 am. The server can analyze the previous schedule to identify one or more tool idle time periods in the previous schedule. The server may filter out any tool idle time periods that may be short, such that a lot cannot be worked on during the short period of time. The server can use configuration data that is stored in a data store to determine a threshold to use to filter out short tool idle time periods. For example, a period may be a short amount of time that may be for setup changes and may not be used for work on a lot, and the server can ignore the tool idle time periods that are used for setup changes.

At block 309, the server determines whether any of the lots in the pool can be assigned to any of the tool idle time periods. The server can iterate over lots in the pool and if any of the lots in the pool were not in the previous schedule and could satisfy a tool idle time period, the server marks the corresponding tool idle time period as partially or fully satisfied by that lot at block 315. An example of a lot in the pool that may satisfy the tool idle time is that the lot can use the current setup of the tool. If none of the lots in the pool can be assigned to the tool idle time periods (block 309), the server determines whether any of other lots, which are not in the pool, can be assigned to the tool idle time periods at block 311.

The server can use selection criteria to determine which of the lots satisfy the tool idle time periods. The selection criteria can be stored in the data store. The server receives input data. The input can include the current lots in the pool. The input can include parameters to tool idle time periods, such as, and not limited to, station, start and end times, previous reticle(s) used by the lots before the tool idle time period, the next reticle(s) used by the lots before the tool idle time period, reticle(s) on the tool at the start of the interval, etc.

The server can select one or more lots using criteria in a pre-defined order and/or user (e.g., system engineer, process engineer, industrial engineer, system administrator, etc.) defined order. Examples of criteria can include, and are not limited, to prefer lots that are part of an unsatisfied move target, prefer lots with a higher objective function weight, prefer lots that use a reticle that is on a tool where the lot step can run, prefer lots that use a setup that is already used on the station where the lot can run, prefer lots in current WIP (work in progress) over predicted lot steps. The server may not prefer lots that were scheduled in the previous schedule, but that started after the end of the previous scheduling interval. For a tool idle time analysis, the selection criteria can include and/or also include, for example, and not limited to, prefer lots with a lower objective function station cost for the station associated with the tool idle time, prefer lots that use the previous or next reticle, prefer lots that use the previous or next setup, prefer lots that use a reticle on the tool, prefer lots whose reticle transport costs are lower, prefer lots whose reticle does not need inspection, do not select a predicted lot that arrives after the start of the interval, etc. A predicted lot has a prediction time for when the lot may be available. For example, a schedule may start at 9:00 am and Lot-A may be processing on Tool-A until 11:00 am. Lot-A's predicted availability for processing on another tool is 11:00 am. Lot-A is a predicted lot. For tool idle time analysis, the server may not assign Lot-A to fill the tool idle time at 9:00 am because Lot-A is not available until 11:00 am.

In one implementation some of the criteria are not applied. The server can iterate over the tool idle time periods and if any of the lots satisfy the tool idle time periods (block 311), the server adds new lots that satisfy any of the tool idle time periods to the pool at block 313. At block 315, the server marks the corresponding tool idle time period as partially or fully satisfied by that lot at block 315.

At block 317, the server identifies one or more performance indicators. The performance indicators can include one or more criteria to meet. An example of performance indicator can include, and is not limited to, a move target. A move target may be a goal. The goal may be a business-oriented goal. For example, the move target may be to process a certain number of lots of a certain type during the scheduling interval. The performance indicator can be stored as part of configuration data in the data store. At block 319, the server determines whether the lots in the pool satisfy the performance indicator criteria. If not, the server determines if there are any of other lots, which are not in the pool, that can be assigned to the tool idle time periods at block 321. The server can use selection criteria to determine which of the lots satisfy the performance indicator criteria. If the server identifies other lots that satisfy the performance indicator criteria (block 321), the server adds the other lots to the pool at block 323.

At block 325, the server determines the amount of work to be performed by the tools for the new schedule that is to be generated. The server can use Equation 1 below to calculate the approximate amount of work that each tool is capable of performing. Suppose lots L, where i=1 ... N can run on station S and that L, requires T, seconds of capacity on S and can run on n, total stations. Then the approximate amount of work for station S is $$W(S) = \sum_{i=1}^{N} \frac{T}{n_i} \quad \text{Equation 1}$$

At block 327, the server determines whether the lots in the pool can satisfy the capacity of work for each tool. The server can determine whether are a sufficient number of lots in the pool such that each station satisfies $$W(S) \geq pSI \quad \text{Equation 2}$$

where SI is the duration of the scheduling interval. In one implementation, the parameter p=1.15. The parameter p may be configurable a configurable value. The parameter p may be pre-defined and/or user (e.g., system engineer, industrial engineer, process engineer, system administrator, etc.) defined. The parameter p represents a buffer to schedule more lots than are strictly necessary in order to help ensure that all stations have enough work.

If there is not a sufficient number of lots in the pool (block 327), the server can add lots, which are not currently in the pool, to the pool until each station satisfies Equation 2 above at block 329. Thus, the quantity pSI may serve as a threshold capacity, which may serve as an indicator that additional lots may be added if the computed work capacity for the tool is below the threshold capacity. The server can use selection criteria to determine which of the lots to add to the pool. At block 331, the server generates a new schedule using the lots in the pool. The pool has a subset of the larger number of lots in the manufacturing facility. For example, there may be one thousand lots in the manufacturing facility that can be schedule and the pool may have four hundred lots of the one thousand lots. The schedules can be stored in the data store. The server can send a schedule to a dispatcher system, a corresponding tool, etc.

Figure 4:
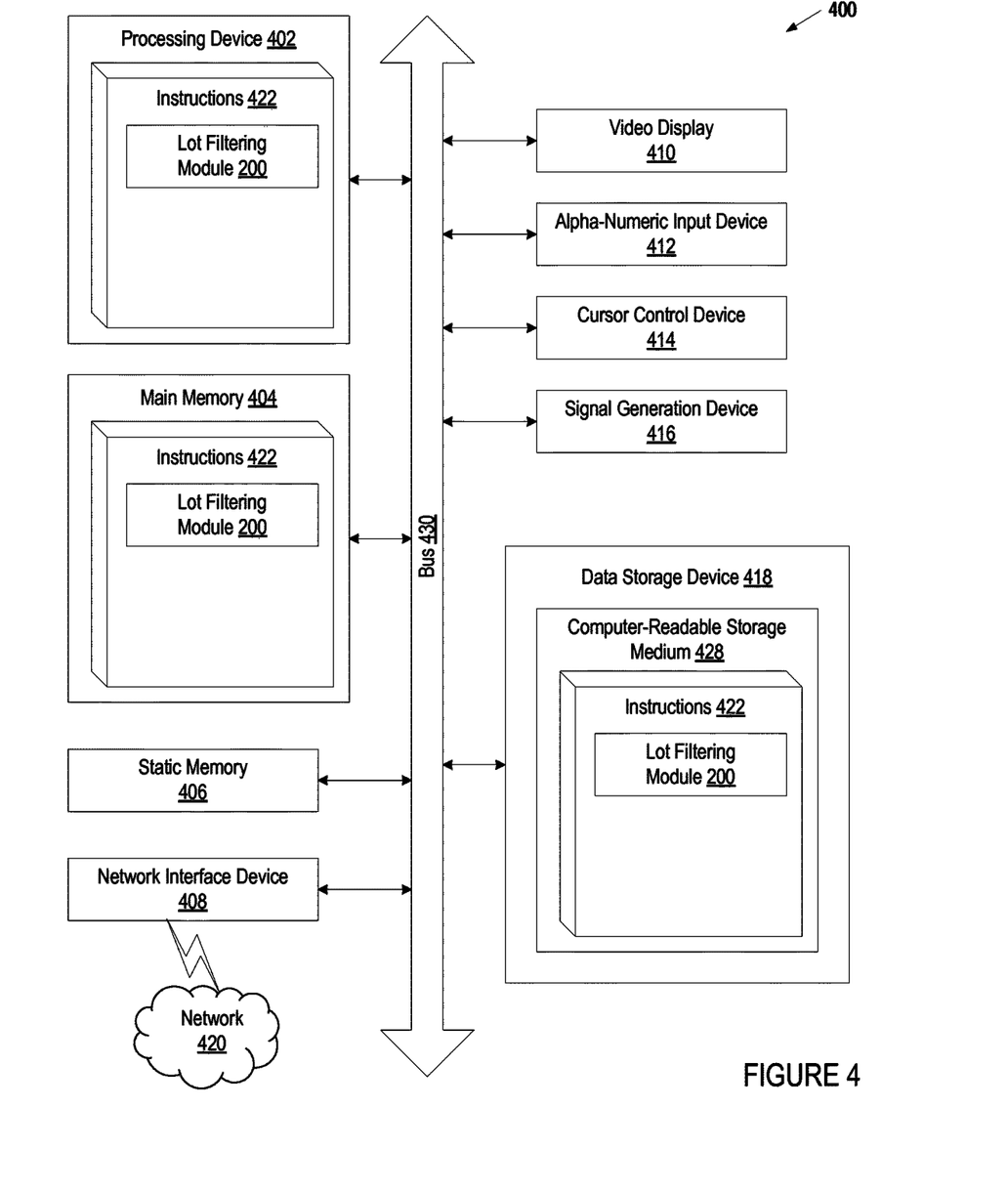
FIG. 4 illustrates an example computer system.

FIG. 4 is a block diagram illustrating an example computing device 400. In one implementation, the computing device corresponds to a computing device hosting a scheduling lot filtering module 107 of FIG. 1. The computing device 400 includes a set of instructions for causing the machine to perform any one or more of the methodologies discussed herein. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer device 400 includes a processing system (processing device) 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the scheduling problem splitter module 470 for performing the operations and steps discussed herein.

The computing device 400 may further include a network interface device 408. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions (instructions of scheduling problem splitter module 470) embodying any one or more of the methodologies or functions described herein. The scheduling problem splitter module 470 may also reside, completely or at least partially, within the main memory 404 and/or within the processing device 402 during execution thereof by the computing device 400, the main memory 404 and the processing device 402 also constituting computer-readable media. The scheduling problem splitter module 470 may further be transmitted or received over a network 420 via the network interface device 408.

While the computer-readable storage medium 428 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, transitory computer-readable storage media, including, but not limited to, propagating electrical or electromagnetic signals, or may be non-transitory computer-readable storage media including, but not limited to, volatile and non-volatile computer memory or storage devices such as a hard disk, solid-state memory, optical media, magnetic media, floppy disk, USB drive, DVD, CD, media cards, register memory, processor caches, random access memory (RAM), etc.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "constructing," "cutting," "identifying," "creating," "generating," "assigning," "sending," or the like, refer to the actions and processes of a computing device, or similar electronic computing device, that manipulates and transforms data represented as physical (e.g., electronic) quantities within the computer system's registers and memories into other data similarly represented as physical quantities within the computer system memories or registers or other such information storage devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method for filtering a lot schedule of a manufacturing facility, the method comprising:
   identifying, by a processing device, a first schedule, wherein the first schedule is a previously executed schedule;
   generating, by the processing device, a pool of lots to be scheduled using information from the first schedule, wherein the pool of lots is a subset of a plurality of lots associated with the first schedule;
   removing invalid lots from the pool of lots, wherein the invalid lots are identified by:
      comparing, with respect to the plurality of lots, a current state of the manufacturing facility to a previous state of the manufacturing facility based on the first schedule; and
      identifying a scheduling conflict based on the comparison of the current state to the previous state, wherein the scheduling conflict comprises at least one of: a determination of unavailability of a tool to the at least one lot; a determination of unavailability of a resource to the at least one lot; a determination that the at least one lot has on-hold status; or a determination that the at least one lot is no longer designated as a work in progress; and
   generating, by the processing device, a second schedule using the pool of lots.

2. The method of claim 1, further comprising:
   identifying, based on the first schedule, a tool having an idle period;
   determining that the idle period is of a long enough duration to accommodate processing a first lot of the pool of lots; and
   assigning the first lot to the tool, wherein the second schedule includes schedule information relating to the assignment of the first lot to the tool.

3. The method of claim 1, further comprising:
   computing a work capacity for a tool of the manufacturing facility, wherein the work capacity is based on a group of lots of the pool of lots that can be processed by the tool, and based on a duration of processing time for each lot of the group of lots.

4. The method of claim 3, further comprising:
   determining whether the computed work capacity for the tool is below a threshold capacity; and
   in response to determining that the computed work capacity is below the threshold capacity, adding at least one additional lot to the pool of lots.

5. A system for filtering a lot schedule of a manufacturing facility, the system comprising:
   a memory; and
   a processing device, coupled to the memory, to:
      identify a first schedule, wherein the first schedule is a previously executed schedule;
      generate a pool of lots to be scheduled using information from the first schedule, wherein the pool of lots is a subset of a plurality of lots associated with the first schedule;
      remove invalid lots from the pool of lots, wherein to remove the invalid lots, the processing device is to:
         compare, with respect to the plurality of lots, a current state of the manufacturing facility to a previous state of the manufacturing facility based on the first schedule; and
         identify a scheduling conflict based on the comparison of the current state to the previous state, wherein the scheduling conflict comprises at least one of: a determination of unavailability of a tool to the at least one lot; a determination of unavailability of a resource to the at least one lot; a determination that the at least one lot has on-hold status; or a determination that the at least one lot is no longer designated as a work in progress; and
      generate a second schedule using the pool of lots.

6. The system of claim 5, wherein the processing device is further to:
   identify, based on the first schedule, a tool having an idle period;
   determine that the idle period is of a long enough duration to accommodate processing a first lot of the pool of lots; and assign the first lot to the tool, wherein the second schedule includes schedule information relating to the assignment of the first lot to the tool.

7. The system of claim 5, wherein the processing device is further to:
compute a work capacity for a tool of the manufacturing facility, wherein the work capacity is based on a group of lots of the pool of lots that can be processed by the tool, and based on a duration of processing time for each lot of the group of lots.

8. The system of claim 7, wherein the processing device is further to:
determine whether the computed work capacity for the tool is below a threshold capacity; and
add at least one additional lot to the pool of lots in response to determining that the computed work capacity is below the threshold capacity.

9. A non-transitory computer-readable storage medium for filtering a lot schedule of a manufacturing facility, the non-transitory computer-readable storage medium storing instructions which, when executed by a processing device, cause the processing device to:
identify a first schedule, wherein the first schedule is a previously executed schedule;
generate generating a pool of lots to be scheduled using information from the first schedule, wherein the pool of lots is a subset of a plurality of lots associated with the first schedule;
remove invalid lots from the pool of lots, wherein to identify the invalid lots, the processing device is to:
compare, with respect to the plurality of lots, a current state of the manufacturing facility to a previous state of the manufacturing facility based on the first schedule; and
identify a scheduling conflict based on the comparison of the current state to the previous state, wherein the scheduling conflict comprises at least one of: a determination of unavailability of a tool to the at least one lot; a determination of unavailability of a resource to the at least one lot; a determination that the at least one lot has on-hold status; or a determination that the at least one lot is no longer designated as a work in progress; and
generate a second schedule using the pool of lots.

10. The non-transitory computer-readable storage medium of claim 9 storing further instructions which, when executed, further cause the processing device to:
identify, based on the first schedule, a tool having an idle period;
determine that the idle period is of a long enough duration to accommodate processing a first lot of the pool of lots; and
assign the first lot to the tool, wherein the second schedule includes schedule information relating to the assignment of the first lot to the tool.

11. The non-transitory computer-readable storage medium of claim 9 storing further instructions which, when executed, further cause the processing device to:
compute a work capacity for a tool of the manufacturing facility, wherein the work capacity is based on a group of lots of the pool of lots that can be processed by the tool, and based on a duration of processing time of each lot of the group of lots;
determine whether the computed work capacity for the tool is below a threshold capacity; and
in response to determining that the computed work capacity is below the threshold capacity, add at least one additional lot to the pool of lots.

* * * * *